(12) United States Patent
Laberinto

(10) Patent No.: US 6,951,294 B1
(45) Date of Patent: Oct. 4, 2005

(54) LAUNDRY DETERGENT DISPENSER

(76) Inventor: Angelo Eugene T. Laberinto, 2239 Foutz Ave., San Diego, CA (US) 92109

( * ) Notice: Subject to any disclaimer, the term of this patent is extended or adjusted under 35 U.S.C. 154(b) by 160 days.

(21) Appl. No.: 10/834,658

(22) Filed: Apr. 30, 2004

(51) Int. Cl.[7] .............................................. B67D 5/52
(52) U.S. Cl. ..................... 222/142; 222/363; 222/368
(58) Field of Search ............................... 222/132, 142, 222/359, 363, 368

(56) References Cited

U.S. PATENT DOCUMENTS

| | | | |
|---|---|---|---|
| 1,205,088 A | * | 11/1916 | Fietdch ........................ 222/142 |
| 2,567,282 A | * | 9/1951 | Gardner et al. .............. 222/363 |
| 3,735,899 A | * | 5/1973 | Rollinson .................... 222/368 |
| 4,232,718 A | | 11/1980 | Wippermann |
| 5,139,172 A | | 8/1992 | Brown |
| 5,183,870 A | | 2/1993 | Fukushima et al. |
| 5,375,744 A | | 12/1994 | Henderson |
| 5,529,219 A | | 6/1996 | Ward |
| 5,642,762 A | | 7/1997 | Greenberg et al. |
| 5,685,460 A | * | 11/1997 | Vlastuin ....................... 222/368 |
| 5,704,517 A | * | 1/1998 | Lancaster, Jr. .............. 222/368 |
| 6,308,860 B2 | * | 10/2001 | Eagle ........................... 222/132 |

\* cited by examiner

Primary Examiner—Philippe Derakshani

(57) ABSTRACT

A laundry detergent dispenser includes a housing that has a bottom wall, a front wall, a back wall, a first side wall and a second side wall. The front wall has a first compartment and a second compartment extending therein. A container is mounted within the housing and has first downspout and a second downspout fluidly coupled thereto. Each of the first and second downspouts extends into one of the first and second compartments. Laundry detergent may be positioned within the container. Each of a first dispenser and a second dispenser is mounted within and substantially blocking one of the first and second downspouts. Each of the first and second dispensers is adapted for selectively dispensing a measuring quantity of detergent from the container and into a respective one of the first and second compartments. The first dispenser dispenses a greater amount of the laundry detergent than the second dispenser.

17 Claims, 5 Drawing Sheets

LAUNDRY DETERGENT DISPENSER

BACKGROUND OF THE INVENTION

1. Field of the Invention

The present invention relates to detergent dispensing devices and more particularly pertains to a new detergent dispensing device for selectively dispensing laundry detergent.

2. Description of the Prior Art

The use of detergent dispensing devices is known in the prior art. U.S. Pat. No. 5,193,670 describes a coin operated laundry detergent dispensing device. Another type of device that could be utilized for detergent dispensing is U.S. Pat. No. 5,139,172 having a container that includes a spigot which may be selectively opened for releasing the contents of the container. Yet another dispensing device is U.S. Pat. No. 4,232,718 which includes a container having an opening in the bottom thereof. A tray is biased in such a manner that it is positioned such that it covers the opening. A cup may be pushed against the tray so that as it moves away from the opening, the cup is positioned below the opening so that it may catch detergent as it flows outward of the opening.

While these devices fulfill their respective, particular objectives and requirements, the need remains for a device that is well suited for providing measured amounts of laundry detergent as well as other items needed for doing laundry such as bleach and fabric softener sheets. Additionally, the device should provide more than one measurement of laundry detergent. Such a device would make the process of washing and drying clothes much more convenient.

SUMMARY OF THE INVENTION

The present invention meets the needs presented above by generally comprising a housing that has a bottom wall, a front wall, a back wall, a first side wall and a second side wall. The housing has an open upper end for selectively accessing an interior of the housing. The front wall has a first compartment and a second compartment extending therein. Each of the first and second compartments is positioned in the front wall. A container is mounted within the housing and has first downspout and a second downspout fluidly coupled thereto. Each of the first and second downspouts extends into one of the first and second compartments. Laundry detergent may be positioned within the container. Each of a first dispenser and a second dispenser is mounted within and substantially blocking one of the first and second downspouts. Each of the first and second dispensers is adapted for selectively dispensing a measuring quantity of detergent from the container and into a respective one of the first and second compartments. The first dispenser is adapted for dispensing a greater amount of the laundry detergent than the second dispenser.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
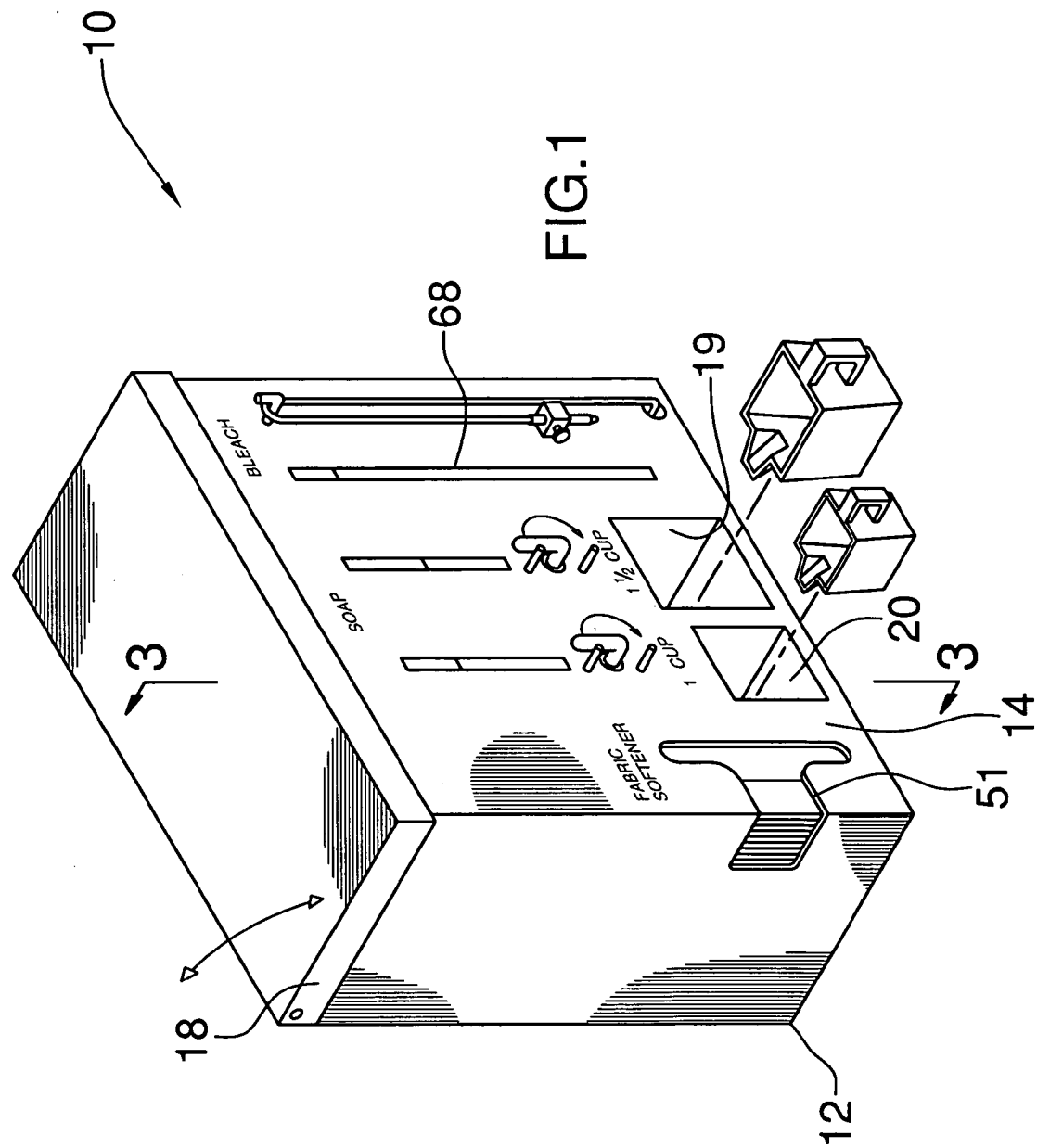
FIG. 1 is a schematic perspective view of a laundry detergent dispenser according to the present invention.
Figure 2:
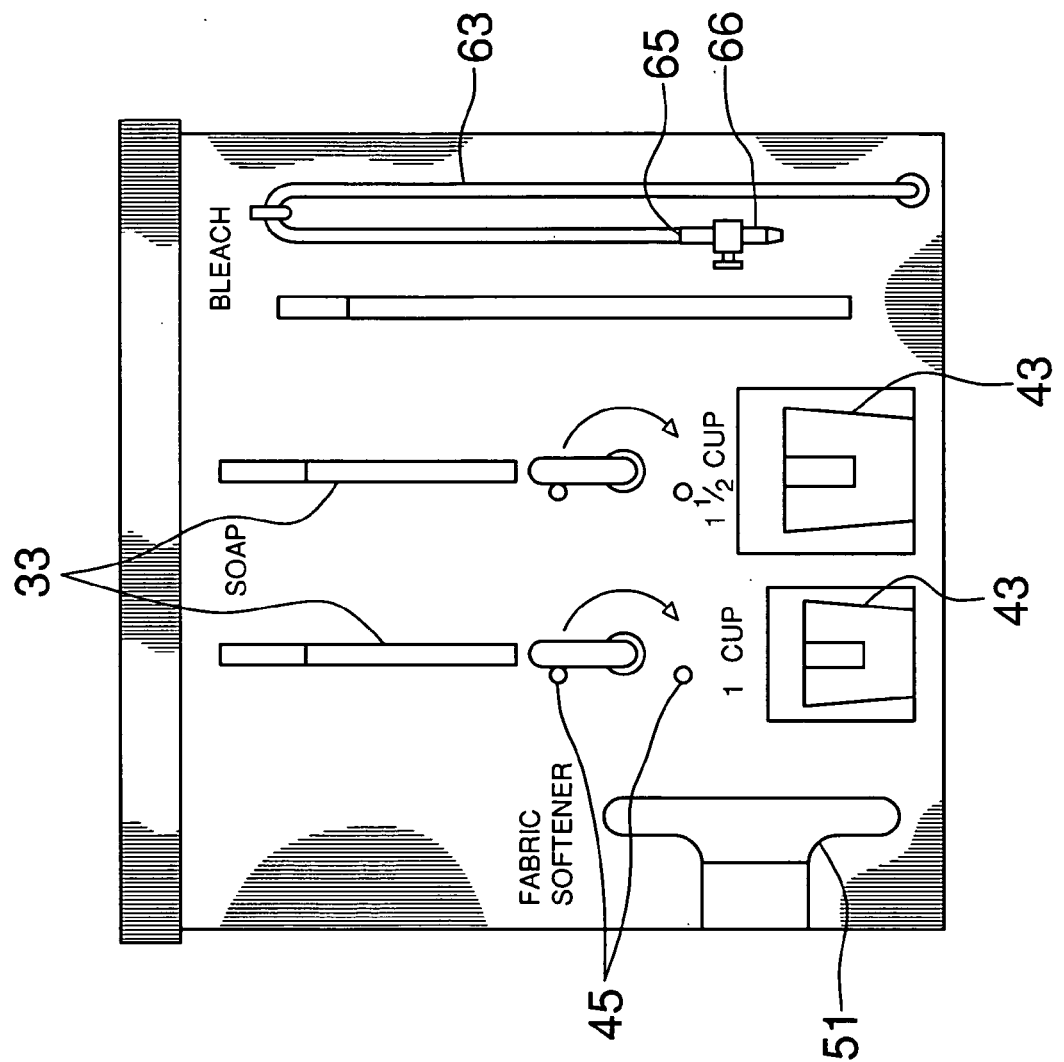
FIG. 2 is a schematic front view of the present invention.
Figure 3:
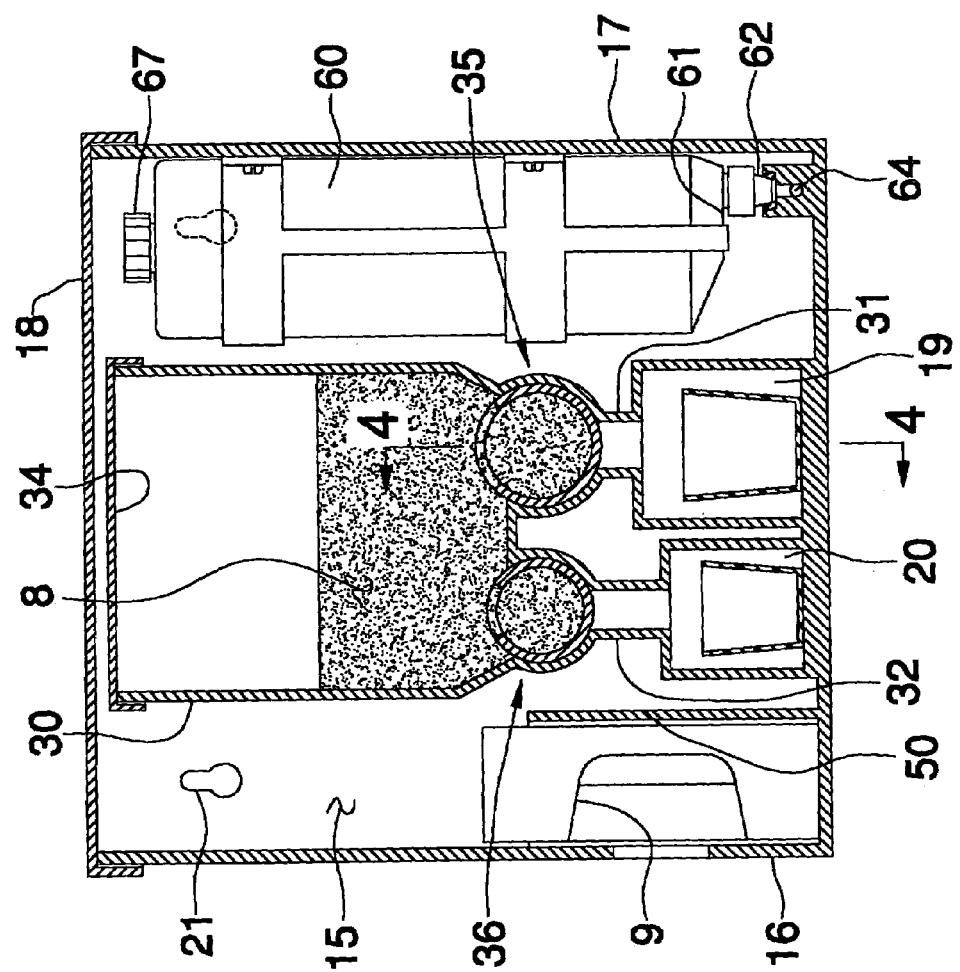
FIG. 3 is a schematic cross-sectional view taken along line 3—3 of FIG. 1 of the present invention.
Figure 4:
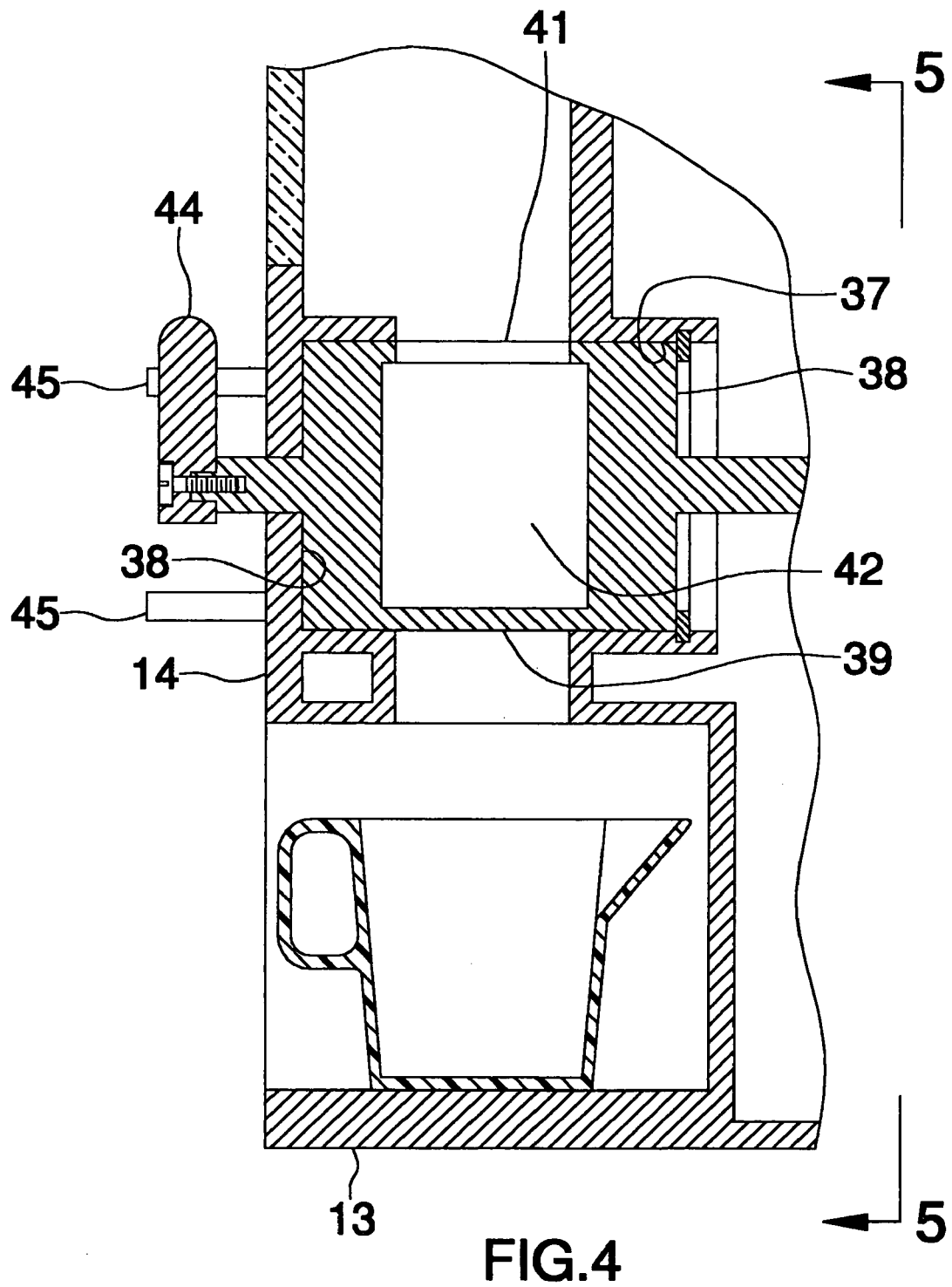
FIG. 4 is a schematic cross-sectional view taken along line 4—4 of FIG. 3 of the present invention.
Figure 5:
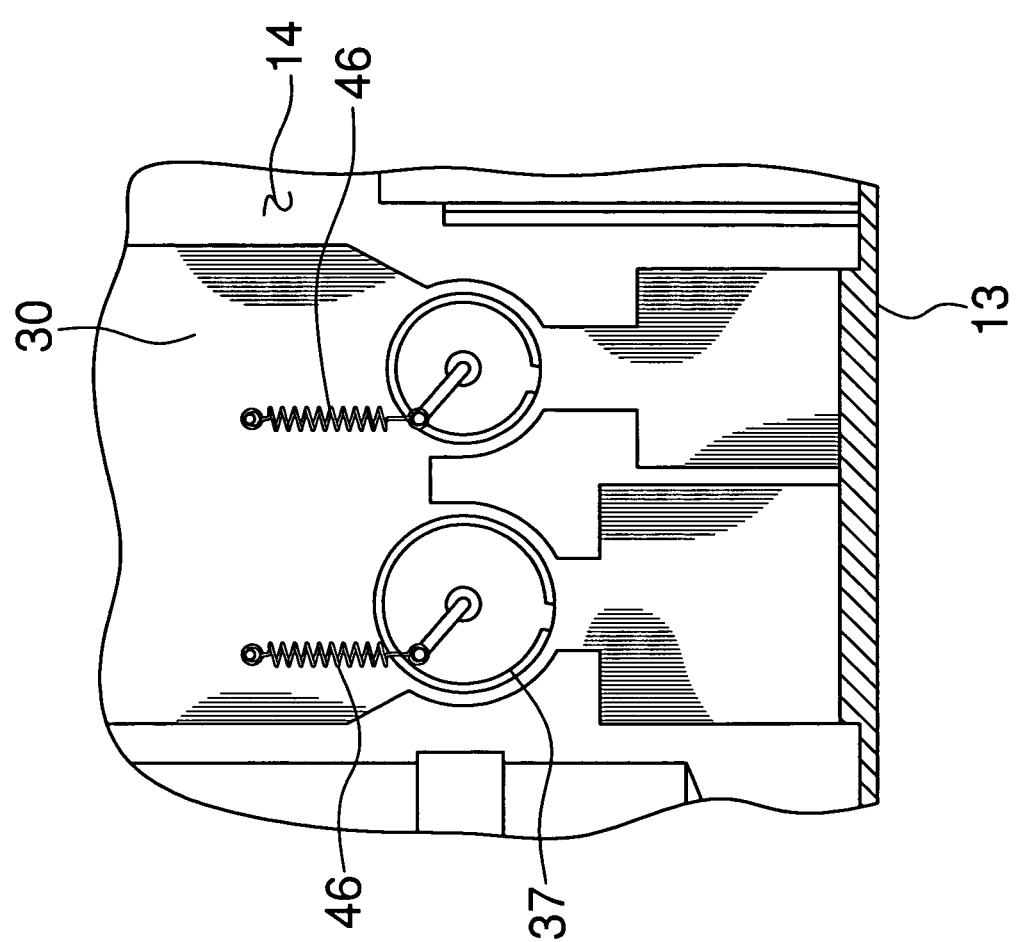
FIG. 5 is a schematic cross-sectional view taken along line 5—5 of FIG. 4 of the present invention.

With reference now to the drawings, and in particular to FIGS. 1 through 5 thereof, a new detergent dispensing device embodying the principles and concepts of the present invention and generally designated by the reference numeral 10 will be described.

As best illustrated in FIGS. 1 through 5, the laundry detergent dispenser 10 generally comprises a housing 12 that has a bottom wall 13, a front wall 14, a back wall 15, a first side wall 16 and a second side wall 17. The housing 12 has an open upper end for selectively accessing an interior of the housing 12. A cover 18 is removably positioned over the upper end of the housing 12 for selectively opening or closing the housing 12. The cover 18 is preferably hingedly coupled to the housing 12. The front wall 14 has a first compartment 19 and a second compartment 20 extending therein. Each of the first 19 and second 20 compartments are positioned in the front wall 14. The back wall 15 preferably has notches 21 cut therein for receiving mechanical fasteners so that that the housing 12 may be mounted on a vertical wall surface.

A container 30 is mounted within the housing 12. The container 30 has first downspout 31 and a second downspout 32 fluidly coupled thereto. Each of the first 31 and second 32 downspouts extends into one of the first 19 and second 20 compartments. Preferably, the front wall 12 has at least one window 33 therein extending into the container 30 for selectively viewing an interior of the container 30. Laundry detergent 8 may be positioned within the container 30 through an open upper portion of the container 30. A cover 34 may be positioned on the container 30 for closing the container 30.

A first dispenser 35 and a second dispenser 36 are provided. Each of the first 35 and second 36 dispensers is mounted within and substantially blocks one of the first 31 and second 32 downspouts. Each of the first 35 and second 36 dispensers includes a cylinder 37 having a pair of outer walls 38 and peripheral wall 39 extending between and is attached to the outer walls 38. The cylinders 37 are each selectively rotated along an axis extending through the outer walls 38 and orientated perpendicular to the front wall 14 of the housing 12. Each of the peripheral walls 39 of the cylinders 37 has an aperture 41 therein. The apertures 41 extend into an internal space 42 of the cylinders 37. The apertures 41 are selectively positioned in a filling position directed toward the container 30 and a dispensing position directed toward a respective one of the compartments 19, 20. In this way, the cylinders 37 are adapted for dispensing measured quantities of detergent 8 from the container 30 to the compartments 19, 20. The internal space 42 of the first dispenser 35 has a greater size than the internal space 42 of the second dispenser 36. Ideally, the first dispenser 35 has an internal space 42 volume equal to about 1½cups and the second dispenser 36 has an internal space 42 volume equal to about 1 cup. Cups 43 are preferably provided which have a size and shape adapted for being positioned within the first 19 and second 20 compartments.

Each of a pair of actuators 44 extends through the front wall 14 and is attached to one of the first 35 and second 36 dispensers. Each of the actuators 44 is adapted for actuating one of the first and second dispensers. The actuators 44 each preferably comprise a handle that is attached to one of the cylinders 37. Stops 45 are attached to the front wall 14 for preventing the over-turning of the cylinders 37 and for indicating the filling and dispensing positions.

Each of a pair of biasing members 46 is coupled to one of the first 35 and second 36 dispensers and is adapted for biasing the cylinders 37 toward the filling position. The biasing members 46 each preferably include springs having a first end attached to the container 30 and a second end attached to the respective cylinder 37. When the cylinders 37 are rotated to the dispensing position, the springs, or biasing members 46, are stretched so that when the actuators 45 are released, the springs 46 pull the cylinders 37 back to the filling position.

A vertical wall 50 is attached to and extends upwardly from the bottom wall 13. The vertical wall 50 is orientated generally parallel to the first side wall 16 and is positioned between the first side wall 16 and the first 19 and second 20 compartments such that a box receptacle is defined between vertical wall 50 and the first side wall 16. The front wall 14 has a slot 51 therein for accessing the box receptacle. A box 9 having fabric softener sheets therein may be positioned in the box receptacle so that the sheets may be gripped and removed through the slot 51. The slot 15 preferably extends into a juncture of the front wall 14 and first side wall 16 and then into the first side wall 16.

A bottle 60 is mounted in the housing 12. The bottle 60 has a bottom end 61 having an outlet 62 fluidly coupled thereto. A tube 63 has a first end 64 and a second end 65. The first end 64 is fluidly coupled to the outlet 62. The tube 63 extends through the front wall 14 and outwardly of the housing 12. A valve 66 is fluidly coupled to the second end 65 of the tube 63 for selectively opening or closing the tube 63. Bleach may be selectively positioned within the bottle 60 so that it may be accessed through the tube 63. An additional window 68 may be positioned in the front wall 14 for viewing the bleach level within the bottle 60. The bottle 60 preferably has a top side having an opening therein with a cap 67 attached thereto. The cap 67 may be removed for selectively filling the bottle 60 with additional bleach.

In use, device 10 provides its user with all of the items needed for washing clothes. In particular, these include laundry detergent, bleach and fabric softener sheets. The device 10 also measures out different amounts of laundry detergent depending on the size of the load of laundry to be washed. The housing 12 may be mounted on a wall within a laundry room of a dwelling to make its use easily accessible.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A holding and dispensing apparatus for dispending laundry detergent and the like, said apparatus including:
    a housing having a bottom wall, a front wall, a back wall, a first side wall and a second side wall, said housing having an open upper end for selectively accessing an interior of said housing, said front wall having a first compartment and a second compartment extending therein, each of said first and second compartments being positioned in said front wall;
    a container being mounted within said housing, said container having first downspout and a second downspout fluidly coupled thereto, each of said first and second downspouts extending into one of said first and second compartments, wherein laundry detergent may be positioned within said container; and
    a first dispenser and a second dispenser, each of said first and second dispensers being mounted within and substantially blocking one of said first and second downspouts, each of said first and second dispensers being adapted for selectively dispensing a measuring quantity of detergent from said container and into a respective one of said first and second compartments, said first dispenser being adapted for dispensing a greater amount of the laundry detergent than said second dispenser.

2. The apparatus according to claim 1, further including a cover being removably positioned over said upper end of said housing for selectively opening or closing said housing.

3. The apparatus according to claim 1, wherein said front wall has at least one window therein extending into said container for selectively viewing an interior of said container.

4. The apparatus according to claim 1, wherein each of said first and second dispensers includes a cylinder having a pair of outer walls and peripheral wall extending between and being attached to said outer walls, each of said cylinders being selectively rotated along an axis extending through said outer walls and orientated perpendicular to said front wall of said housing, each of said peripheral walls of said cylinders having an aperture therein, each of said apertures extending into an internal space of said cylinders, said apertures being selectively positioned in a filling position directed toward said container and a dispensing position directed toward a respective one of said compartments, said internal space of said first dispenser having a greater size than said internal space of said second dispenser.

5. The apparatus according to claim 4, further including a pair of actuators, each of said actuators extending through said front wall and being attached to one of said first and second dispensers, each of said actuators being adapted for actuating one of said first and second dispensers, each of said actuators comprising a handle being attached to one of said cylinders.

6. The apparatus according to claim 1, further including a pair of actuators, each of said actuators extending through said front wall and being attached to one of said first and second dispensers, each of said actuators being adapted for actuating one of said first and second dispensers.

7. The apparatus according to claim 5, further including a pair of biasing members, each of said biasing members being coupled to one of said first and second dispensers and being adapted for biasing said cylinders toward said filling position.

8. The apparatus according to claim 4, further including a pair of biasing members, each of said biasing members being coupled to one of said first and second dispensers and being adapted for biasing said cylinders toward said filling position.

9. The apparatus according to claim 8, further including a vertical wall being attached to and extending upwardly from said bottom wall, said vertical wall being orientated generally parallel to said first side wall, said vertical wall being positioned between said first side wall and said first and second compartments such that a box receptacle is defined between vertical wall and said first side wall, said front wall having a slot therein for accessing said box receptacle, wherein a box having fabric softener sheets therein may be positioned in said box receptacle.

10. The apparatus according to claim 1, further including a vertical wall being attached to and extending upwardly from said bottom wall, said vertical wall being orientated generally parallel to said first side wall, said vertical wall being positioned between said first side wall and said first and second compartments such that a box receptacle is defined between vertical wall and said first side wall, said front wall having a slot therein for accessing said box receptacle, wherein a box having fabric softener sheets therein may be positioned in said box receptacle.

11. The apparatus according to claim 4, further including a vertical wall being attached to and extending upwardly from said bottom wall, said vertical wall being orientated generally parallel to said first side wall, said vertical wall being positioned between said first side wall and said first and second compartments such that a box receptacle is defined between vertical wall and said first side wall, said front wall having a slot therein for accessing said box receptacle, wherein a box having fabric softener sheets therein may be positioned in said box receptacle.

12. The apparatus according to claim 1, further including a bottle being mounted in said housing, said bottle having a bottom end having an outlet fluidly coupled thereto, a tube having a first end and a second end, said first end being fluidly coupled to said outlet, said tube extending through said front wall and outwardly of said housing, a valve being fluidly coupled to said second end of said tube for selectively opening or closing said tube, wherein bleach may be selectively positioned within said bottle.

13. The apparatus according to claim 4, further including a bottle being mounted in said housing, said bottle having a bottom end having an outlet fluidly coupled thereto, a tube having a first end and a second end, said first end being fluidly coupled to said outlet, said tube extending through said front wall and outwardly of said housing, a valve being fluidly coupled to said second end of said tube for selectively opening or closing said tube, wherein bleach may be selectively positioned within said bottle.

14. The apparatus according to claim 8, further including a bottle being mounted in said housing, said bottle having a bottom end having an outlet fluidly coupled thereto, a tube having a first end and a second end, said first end being fluidly coupled to said outlet, said tube extending through said front wall and outwardly of said housing, a valve being fluidly coupled to said second end of said tube for selectively opening or closing said tube, wherein bleach may be selectively positioned within said bottle.

15. The apparatus according to claim 8, wherein said front wall has at least one window therein extending into said container for selectively viewing an interior of said container.

16. The apparatus according to claim 4, wherein said front wall has at least one window therein extending into said container for selectively viewing an interior of said container.

17. A holding and dispensing apparatus for dispending laundry detergent and the like, said apparatus including:
  a housing having a bottom wall, a front wall, a back wall, a first side wall and a second side wall, said housing having an open upper end for selectively accessing an interior of said housing, a cover being removably positioned over said upper end of said housing for selectively opening or closing said housing, said front wall having a first compartment and a second compartment extending therein, each of said first and second compartments being positioned in said front wall;
  a container being mounted within said housing, said container having first downspout and a second downspout fluidly coupled thereto, each of said first and second downspouts extending into one of said first and second compartments, said front wall having at least one window therein extending into said container for selectively viewing an interior of said container, wherein laundry detergent may be positioned within said container;
  a first dispenser and a second dispenser, each of said first and second dispensers being mounted within and substantially blocking one of said first and second downspouts, each of said first and second dispensers including a cylinder having a pair of outer walls and peripheral wall extending between and being attached to said outer walls, each of said cylinders being selectively rotated along an axis extending through said outer walls and orientated perpendicular to said front wall of said housing, each of said peripheral walls of said cylinders having an aperture therein, each of said apertures extending into an internal space of said cylinders, said apertures being selectively positioned in a filling position directed toward said container and a dispensing position directed toward a respective one of said compartments, said internal space of said first dispenser having a greater size than said internal space of said second dispenser;
  a pair of actuators, each of said actuators extending through said front wall and being attached to one of said first and second dispensers, each of said actuators being adapted for actuating one of said first and second dispensers, each of said actuators comprising a handle being attached to one of said cylinders;
  a pair of biasing members, each of said biasing members being coupled to one of said first and second dispensers and being adapted for biasing said cylinders toward said filling position;
  a vertical wall being attached to and extending upwardly from said bottom wall, said vertical wall being orientated generally parallel to said first side wall, said vertical wall being positioned between said first side wall and said first and second compartments such that a box receptacle is defined between vertical wall and said first side wall, said front wall having a slot therein for accessing said box receptacle, wherein a box having fabric softener sheets therein may be positioned in said box receptacle; and a bottle being mounted in said housing, said bottle having a bottom end having an outlet fluidly coupled thereto, a tube having a first end and a second end, said first end being fluidly coupled to said outlet, said tube extending through said front wall and outwardly of said housing, a valve being fluidly coupled to said second end of said tube for selectively opening or closing said tube, wherein bleach may be selectively positioned within said bottle.

* * * * *